United States Patent [19]

Moulton

[11] Patent Number: 4,468,807
[45] Date of Patent: Aug. 28, 1984

[54] METHOD FOR ANALYZING STORED IMAGE DETAILS

[75] Inventor: Clifford H. Moulton, Portland, Oreg.

[73] Assignee: Palmguard, Inc., Beaverton, Oreg.

[21] Appl. No.: 282,866

[22] Filed: Jul. 13, 1981

Related U.S. Application Data

[63] Continuation-in-part of Ser. No. 165,603, Jul. 3, 1980, Pat. No. 4,371,865.

[51] Int. Cl.³ .............................................. G06K 9/56
[52] U.S. Cl. ......................................... 382/2; 382/21
[58] Field of Search .................... 382/2, 21; 340/825.3, 340/825.31, 825.32, 825.33, 825.34

[56] References Cited

U.S. PATENT DOCUMENTS

| | | | |
|---|---|---|---|
| 3,581,282 | 5/1971 | Altman | 382/2 |
| 3,648,240 | 3/1972 | Jacoby et al. | 382/2 |
| 4,107,775 | 8/1978 | Ott | 382/2 |
| 4,186,378 | 1/1980 | Moulton | 382/2 |
| 4,206,441 | 6/1980 | Kondo | 382/2 |
| 4,236,082 | 11/1980 | Butler | 382/2 |

Primary Examiner—Leo H. Boudreau
Attorney, Agent, or Firm—Adrian J. LaRue; George T. Noe

[57] ABSTRACT

A method for analyzing stored image details for identification purposes is disclosed in which slopes are abstracted from an image to provide three-dimensional recognition information as abstractions. Data representing light levels of an image are stored in a picture memory device, which is analyzed in a predetermined manner to select absolute illumination magnitudes between fixed locations of the image. This information is directly related to the slope between the locations. Steeper slopes and their corresponding locations are stored as recognition data in a learn mode. These abstractions are compared and several are permanently stored. In an access mode, the previously-obtained information is utilized to verify with current data, and depending upon the degree of correlation therebetween, an indication of recognition is either verified or rejected. If current data is better than any of the permanently-stored data, the permanently-stored data is replaced by the current data to update the permanently-stored data.

3 Claims, 12 Drawing Figures

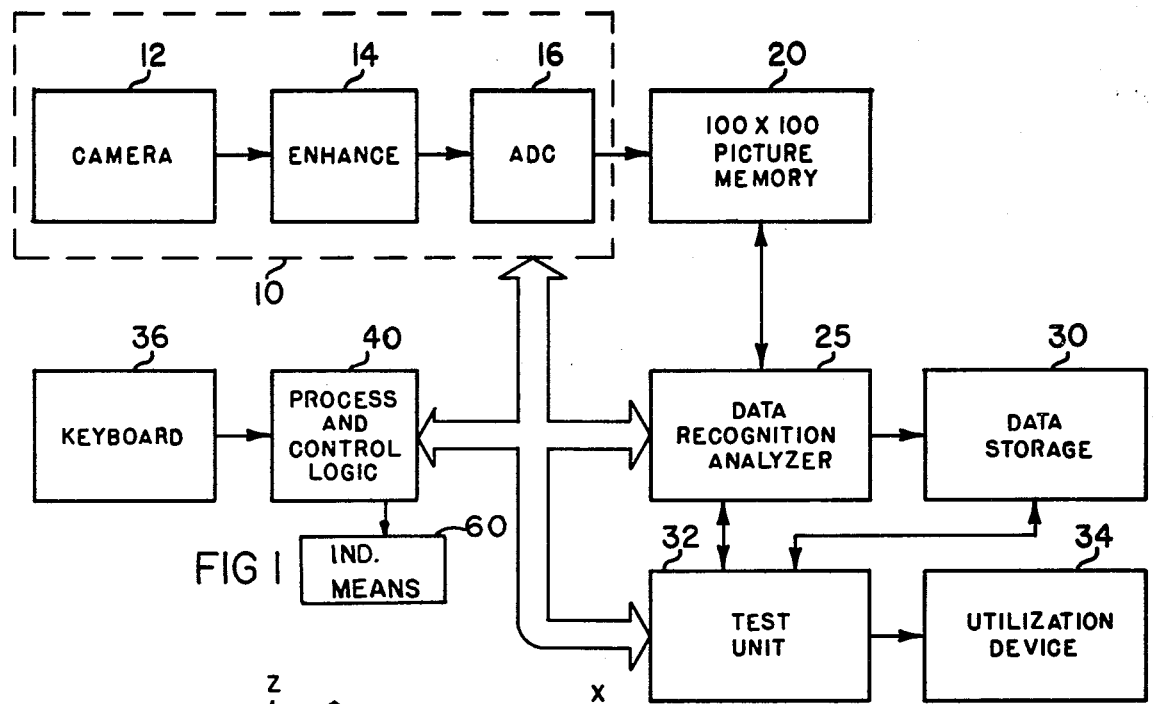
FIG 1
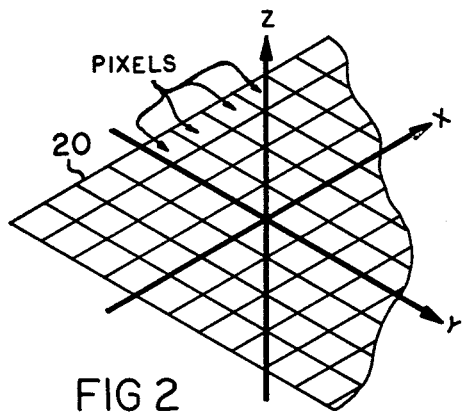
FIG 2
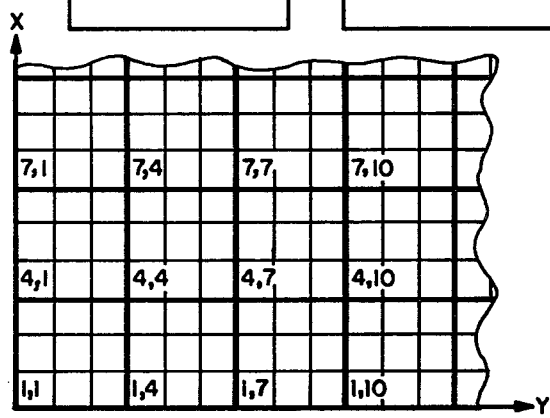
FIG 3
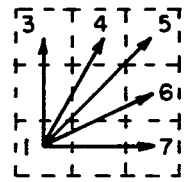
FIG 4A
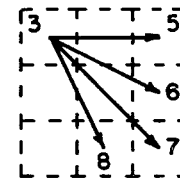
FIG 4B
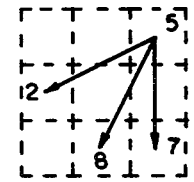
FIG 4C
FIG 4D
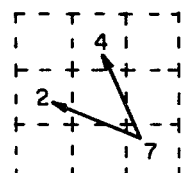
FIG 4E
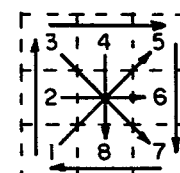
FIG 4F

METHOD FOR ANALYZING STORED IMAGE DETAILS

CROSS REFERENCE TO RELATED APPLICATION

This application is a continuation-in-part application of U.S. patent application Ser. No. 165,603 filed July 3, 1980, now U.S. Pat. No. 4,371,865.

BACKGROUND OF THE INVENTION

Electronic identification systems are utilized in a number of applications in which verification of personal identity is required, such as to facilitate banking transactions and to permit access to restricted areas. Some of these systems merely read coded information magnetically stored on a plastic wallet-sized card, while more sophisticated systems are designed to provide a positive identification by reading an actual physical recognition pattern which is unique to an individual and then comparing the data derived therefrom with previously-stored data derived from the same pattern source.

U.S. Pat. No. 4,186,378 teaches an electronic identification system in which the palm of an individual's hand is scanned in a predetermined manner by an image-sensing camera, and an image pattern corresponding to the palm print is stored. Recognition data to recognize the palm on subsequent presentations of the palm are abstracted from the image pattern in accordance with the most prominent details. Thus, analysis of the stored picture details is based on two-dimensional pattern aspects of the image.

SUMMARY OF THE INVENTION

The present invention is related to methods for analyzing stored image details in identification systems, and in particular to a method for analyzing stored image details in accordance with the three-dimensional aspects thereof.

The characteristics of a person's palm can change which changes pattern geometry because of flexibility of the hand when its palm is pressed into position during the time the palm is scanned in the manner as taught in U.S. Pat. No. 4,186,378 and U.S. Pat. No. 4,371,865.

The change in characteristics of the palm can occur due to pressure of the hand on the palm-positioning area, aging, illness, temperature variations, camera operation, etc.

This can make it difficult for the electronic identification system to recognize the palm on subsequent presentations.

The image details are obtained and stored in the conventional manner, as taught in U.S. Pat. No. 4,186,378. That is, the palm of an individual's hand is scanned in a predetermined manner by a camera such as a vidicon or a solid-state charge-coupled image sensor to produce an analog signal which is proportional to the light levels received from the palm. The analog signal, which may be differentiated to enhance the definition of ridges and valleys of the palm print, is quantized by a conventional analog-to-digital converter to provide raw numerical digital data corresponding to the various light levels of the pattern, and then this raw data is stored in a 100-element by 100-element memory array to represent a complete three-dimensional picture of a palm identity pattern.

The picture memory may be represented by a Cartesian coordinate system, wherein the picture-element (pixel) array defines the X-Y plane, and the amplitude of stored data representing illumination levels defines the Z axis. The 10,000 pixels of the 100-element by 100-element memory array represent coordinate points of a picture and are subdivided into small groups each of which has a predetermined number of vectors in fixed locations in the X-Y plane. The groups are analyzed in a predetermined manner to abstract from each group the vector having the largest absolute magnitude Z component difference from origin to end point. Depending upon vector length, the Z component provides information as to the slope of the vector with reference to the X-Y plane. The steepness of the slope is assigned a quality value, with steeper slopes having a higher quality. Total information abstracted from each group of pixels, therefore, is vector location, direction, polarity, and quality. The abstracted vectors are then ranked in their order from highest quality to lowest quality, and then stored in a separate array. From this information, prominent recognition data representative of three-dimensional aspects of stored image details, such as slopes and flexions (indicative of valleys and peaks), may be selected and encoded in compact form for permanent storage.

Four of the best abstractions that have been selected and encoded in compact form are permanently stored for verification purposes.

For verification purposes, the palm pattern is read and stored in the same manner as the original raw data was obtained so that a correlation process can take place to attempt to match the compacted recognition data with newly-obtained data. When the palm pattern is read and stored in the same manner as the original raw data was obtained, a correlation process can take place to attempt to match one or more of the compacted recognition data files against the newly-obtained image data. Based on one or more correlations, a decision is made as to whether an identification is verified with at least one of the four stored abstractions.

It is therefore one object of the present invention to provide a method of recognizing an image to provide identification thereof by comparing a selected pattern of slopes with a previously-stored pattern of slopes.

It is another object of the present invention to provide in an identification system a novel method of analyzing stored image details in accordance with three-dimensional aspects thereof.

It is a further object of the present invention to provide in an automatic electronic identification system recognition data by comparing slopes between fixed locations of an image.

An additional object of the present invention is the provision of an automatic electronic identification system that permanently stores at least four of the best abstractions of a palm pattern which are used for future verification.

Other objects and advantages will become apparent to those having ordinary skill in the art upon a reading of the following description when taken in conjunction with the accompanying drawings.

BRIEF DESCRIPTION OF THE DRAWINGS

FIG. 1 is a block diagram of an identification system which employs the analysis method of the present invention;

FIG. 2 shows a fractional portion of a picture memory lying the X-Y plane of a Cartesian coordinate system;

FIG. 3 shows a fractional portion of a picture memory subdivided into 9-pixel blocks;

FIGS. 4A through 4F illustrate a 9-element group of pixels and the analysis sequence thereof;

DETAILED DESCRIPTION OF THE INVENTION

Figure 5:
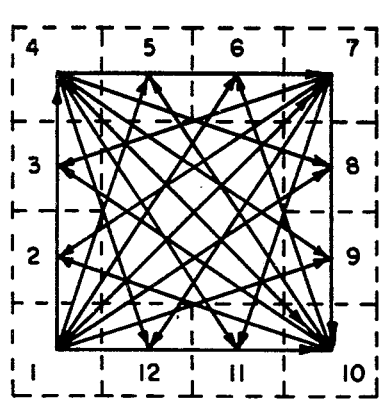
FIG. 5 is a diagram of the analysis pattern of a 4-pixel by 4-pixel array.

Referring now to FIG. 1, a block diagram of an identification system which employs the analysis method of the present invention is shown. Generally, the overall system comprises a recognition data acquisition unit 10, a picture memory device 20, a recognition data analyzer 25, a data storage unit 30, a test unit 32, a utilization device 34, a keyboard 36, and a process and control logic unit 40. The system is basically that shown and described in U.S. Pat. No. 4,186,378. A suitable palm-positioning device as disclosed in U.S. Pat. No. 4,357,597 may be provided for the placement of a human hand to ensure proper registration of the palm print for the initial recording of a recognition pattern by the acquisition unit 10 and each subsequent presentation of the palm print for identity verification. The recognition data acquisition unit 10 comprises a camera 12, an enhance circuit 14, and an analog-to-digital converter (ADC) 16. The camera, which may suitably be a conventional television-type vidicon or a solid-state charge-coupled image sensor, raster scans the palm print, outputting an analog voltage signal which is proportional to the light levels obtained from the print on each horizontal scan wherein a positive peak representing high illumination corresponds to a ridge in the palm print pattern and a negative peak corresponds to a valley in the palm print pattern. The enhance circuit 14, which is not essential to the system, enhances the positive and negative peaks of the analog signal to provide a greater pronunciation of light and dark levels. A conventional differentiating circuit such as a series capacitor and a shunt resistor will provide desired enhancement in accordance with the component values selected. The enhanced analog signal is then quantized by the ADC 16 to provide numerical digital data which corresponds to the various voltage levels quantized. Many conventional analog-to-digital converters are commercially available for this purpose.

The quantized, or "digitized" signal is then stored line by line in a 10,000-element picture memory device 20 such that a 100-element by 100-element image of the palm pattern is stored. If this image were read out and viewed on an X-Y display device in the 100 by 100 format, it would be discerned that the vertically-oriented pattern components, or ridge and valley lines, can be more prominent than the horizontally-oriented lines because of the enhancement process which takes place as each horizontal line is recorded. Thus, an optimized image may be formed for the analysis and test procedure which will be described later.

The recognition data analyzer 25 includes a number of conventional read-only memories (ROM's) containing specific logic steps (program instructions burned in), and operates in concert with and under the control of the process and control logic unit 40, which may suitably be a conventional microprocessor unit, for analysis of the pattern image stored in the picture memory device 20.

Certain selected recognition data, to be described later, obtained by the recognition data analyzer 25 is stored along with a user's identity code, obtained from keyboard 36, in the data storage unit 30.

For identity verification, the user places his hand in the palm-positioning device mentioned earlier and enters an identification number into the keyboard 36. The process and control logic unit 40 turns on the camera 12 to read the palm pattern. The enhanced palm print pattern is stored line by line into the 10,000-element picture memory 20 in the same manner described earlier. The user's identity code number ensures retrieval of the correct data from the storage unit 30. The recognition data analyzer 25 then analyzes the newly-stored image using the four analysis patterns and data originally abstracted. That is, since key information previously has been abstracted from image and stored in a learn mode, it is necessary in an access mode only to see if similar key information exists in the newly-stored image, obviating the need to subject a palm pattern to a complete and perhaps lengthy analysis upon subsequent presentations of the palm for identity purposes. The newly-abstracted information is sent to the test unit 32 along with the originally-obtained recognition data to determine whether a reasonable correlation exists. The test unit 32 includes a number of conventional ROM's containing specific logic steps (program instructions burned in) and operates in concert with and under control the process and logic control unit 40 to determine the numerical agreement or degree of agreement between the new and retrieved-from-storage recognition data. Added steps may be incorporated to translate or rotate (skew) the prior stored recognition data for a comparison of best fits to better match the new image details to correct for translational (X-Y displacement) or rotational registration errors. An identity decision is made as to whether a reasonable match exists or does not exist between the stored recognition data and the new recognition data, and an output signal is applied to a utilization device 34 indicating verification or rejection of the new recognition data.

ANALYSIS PROCESS

For this discussion, it will be assumed that a complete image of a palm print is stored in the 100-element by 100-element picture memory 20 as described hereinabove; that is, each picture element (pixel) has stored therein numerical digital data relating to a light level obtained from the palm print. The picture memory may be represented by a Cartesian coordinate system as shown in FIG. 2, wherein the pixel array defines the X-Y plane, and the numerical digital data values define the amplitude along the Z axis. The 10,000 pixels of the memory array are subdivided into small groups, each of which is analyzed in a predetermined manner to pick from each group a vector having the largest absolute magnitude Z component difference from origin to end point. The Z component provides information as to the slope of the vector with reference to the X-Y plane. While a vector is not selected in its absolute $(X^2+Y^2+Z^2)^{\frac{1}{2}}$ sense in this example, it could be a possibility by proper scaling. For example, FIG. 3 shows a portion of the memory array subdivided into 9-pixel blocks, each comprising a 3-element by 3-element subarray. Starting at the bottom left corner of the memory array, each subarray is selected for analysis in accordance with the X-Y location of a predetermined home pixel in each subarray. Sequentially, this selection may be coordinates X,Y=1,1; 1,4; 1,7; 1,10; ... 4,1; 4,4; etc., as shown in FIG. 3, to cover a 99-element by 99-element portion of the 100×100 memory array. Each 9-pixel block of the memory shown in FIG. 3 is analyzed as follows. With reference to FIG. 4A, the outer pixels of the block are assigned addresses 1 through 8 in clockwise direction around the 9-pixel block, with the home pixel being 1, and center pixel being unassigned. Beginning at the home pixel, pixels 1 and 3 are first tested by subtracting the digital number stored in pixel 1 from the digital number stored in pixel 3. The difference is the Z component, and this value, which may be either positive or negative, is stored in a conventional random-access memory (RAM) along with the 1–3 vector location. Then pixels 1 and 4 are tested in the same manner, producing another Z component, which again is stored in the RAM along with the 1-4 vector location. Then the combinations 1-5, 1-6, and 1-7 are in turn examined in the same manner, as shown in FIG. 4B, with the values of the Z components being stored in the RAM along with the vector locations. The analysis continues as shown in FIGS. 4C, 4D, and 4E until fourteen Z component values along with their respective vector locations are stored in the random-access memory. Each group of fourteen values is identified by the X,Y address location of the home pixel so that once the information is abstracted and stored, it may easily be retrieved with certainty as to the exact location from which it was taken. Suppose each pixel contains a 6-bit binary number indicative of the light level stored thereon. Thus, each pixel has stored thereon a number between 0 and 63, depending upon the level of illumination the number represents. Suppose further that pixel 1 of group 1,1 has a value of 35, while pixels 3 and 7 have values of 46 and 28, respectively. The information stored relating to each of these two vectors, then, would be groups of numerical data in the form of 1,1,1,3,11,1 and 1,1,1,7,7,0 respectively, with the first two numbers in each set indicating the X,Y location of the home pixel, the second two numbers in each set indicating the vector locations, the fifth number in the set indicating the value of the Z component of the vector, and the last number of each set indicating the polarity of the slope, e.g., 1=+, 0=−, thereby giving complete information as to each vector. However, it can be appreciated that in this example, there are 33×33, or 1,089 blocks analyzed for the entire picture memory array, each yielding fourteen vectors for a total of 15,246 vectors. Therefore, to save memory space, as each block is analyzed, only the one best of the fourteen vectors in each block is saved so that the number of vectors is 1,089. These vectors may then be ranked in a descending order from highest quality to lowest quality, wherein quality may be equal to either the value of the Z component or a numerical value assigned to the steepness of the slope of the vector with respect to the X-Y plane. Finally, one to two hundred vectors having the highest quality are retained for storage in the data storage unit 30 for subsequent verification purposes. This analysis method therefore provides prominent recognition data relating to three-dimensional aspects of the stored image details, such as slopes and flexions (indicative of valleys and peaks).

Figure 6:
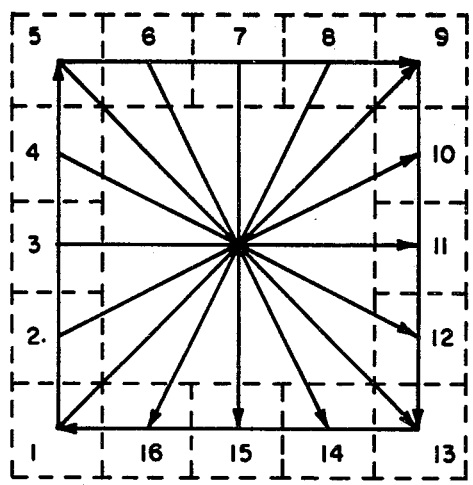
FIG. 6 is a diagram of the analysis pattern of a 5-pixel by 5-pixel array.

While the analysis method hereinabove described involves 3-pixel by 3-pixel subarrays each in a donut pattern yielding fourteen vectors, other analysis procedures could be used without deviating from the general method. For example, FIG. 4F shows analysis of the 3-pixel by 3-pixel subarray using the center pixel as the home pixel and the analysis yielding eight vectors. Also, the memory array 20 could be subdivided into 4-pixel by 4-pixel or 5-pixel by 5-pixel (or more) subarrays as shown in FIGS. 5 and 6 respectively, which in the examples shown yield 22 and 12 vectors respectively. Other patterns are a matter of design choice. A further alternative is to divide the memory array into groups, such as the 3-pixel by 3-pixel subarrays discussed above, take the average of the data stored in the pixels of each group, and then locate one or more vectors extending from one group to another throughout the memory array. This alternative provides region-to-region slope information, rather than point-to-point slope information as described above.

Figure 7:
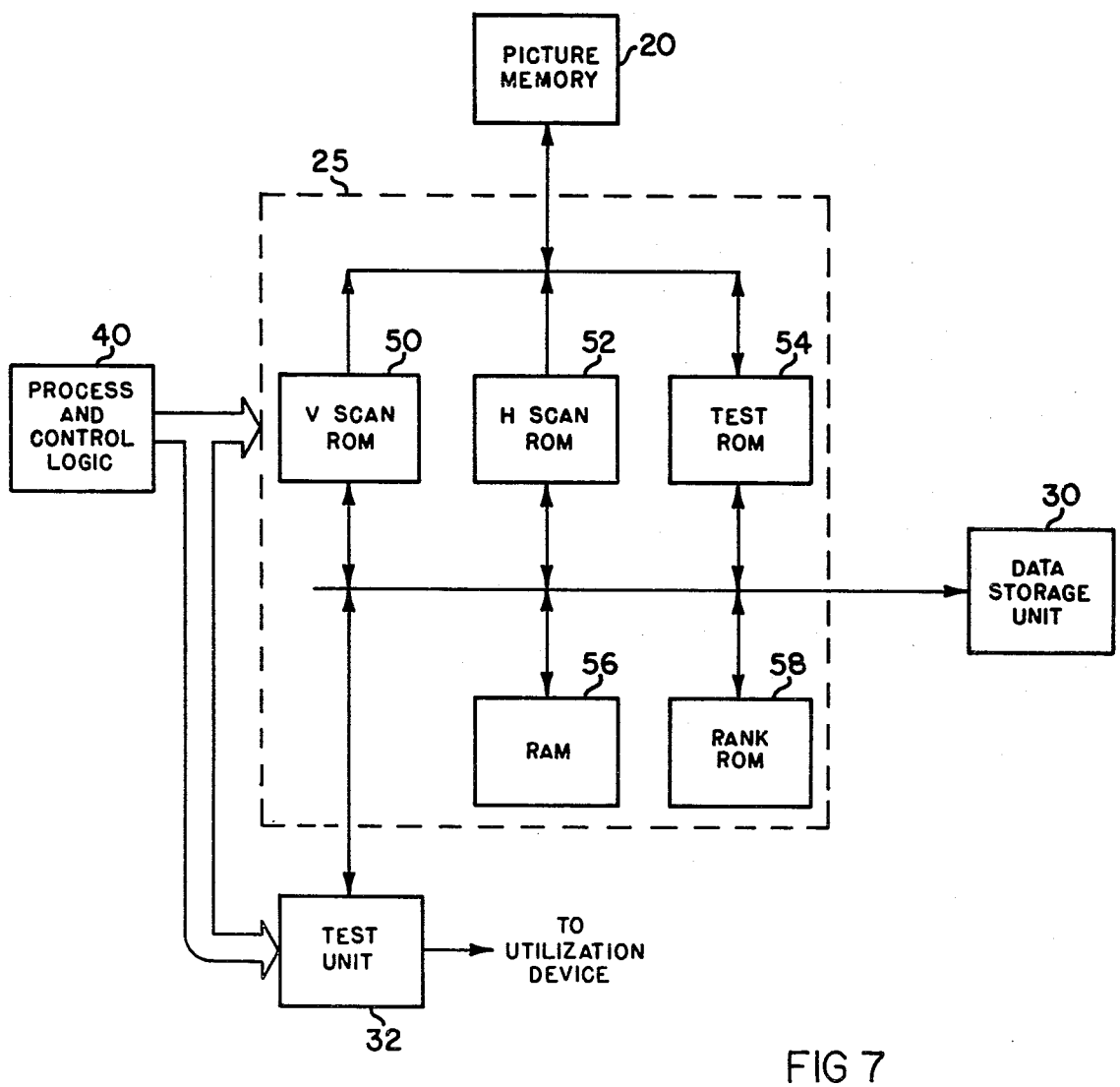
FIG. 7 shows a block diagram of the details of the data recognition analyzer portion of the system of FIG. 1.

FIG. 7 shows a block diagram of the details of the data recognition analyzer 25. Included are a vertical-scan read-only memory (VSCAN ROM) 50, and horizontal-scan read-only memory (HSCAN ROM) 52, a test read-only memory (TEST ROM) 54, random-access memory (RAM) 56, and a rank read-only memory (RANK ROM) 58. Each of the ROM's contains specific logic steps (program instructions burned in) and operate in conjunction with process and control logic unit 40. The VSCAN and HSCAN ROM's locate the X,Y home pixels and vector locations for each vector, the TEST ROM 54 tests for the slope, flexion, and polarity information of the vectors. Flexion is determined by comparing subsequent values of vectors selected as the image is scanned; it is the rate of change of slope. These ROM's operate to abstract vector information from the picture memory 20, storing intermediate and final results in the RAM 56. The RANK ROM 58 sorts the vectors from highest to lowest quality (as defined above) and selects a predetermined number, e.g., one to two hundred of the higher quality vectors so that the most prominent picture details may be encoded in compact form and stored in the data storage unit 30.

The recognition data analyzer 25 may be utilized in both the learn and access modes as discussed earlier. In the learn mode, a complete analysis of the image details stored in picture memory 20 is made in accordance with the foregoing analysis description in order to abstract key information to store in the data storage unit 30. In the access mode, a complete and lengthy analysis upon subsequent presentations of the palm for identity purposes is not needed because the key information is already known and stored in the data storage unit 30. Upon recall of the previously-obtained information from storage, it is necessary only for data analyzer 25 to proceed at once to the picture locations from which the key information was abstracted in order to abstract new information for comparison purposes. Thus, old information is utilized to aid in locating the new information to provide a quick and efficient identity verification. The test unit 32 operates as described above.

Alternatively, since the previously-obtained information is utilized to locate new recognition information, a one-vector-at-a-time location and comparison could take place completely within in data analyzer without the need for a separate test unit. For example, upon the recall of previously-stored recognition data, the address of the old vector or slope is utilized to locate a new one. Then the quality value may be compared immediately. The old vector may be translated or rotated on the new image to determine the best fit. The degree of correlation between the old and new data may be sent to a decision circuit, for which a minimum level of acceptance is predetermined to verify or reject recognition of the new image.

An alternative embodiment of the present invention is to permanently store at least four of the best abstractions of a palm pattern for the purposes of future identification. This is done by the person operating keyboard 36 to send to process and control logic unit 40 the person's code relating to the person's palm for future identification and to commence operation of unit 40 by turning on indicating means 60 informing the person to place his hand into engagement with the palm-positioning device. Upon proper positioning of the person's hand in engagement with the palm-positioning device, unit 40 causes an image of the person's palm from camera 12 to be processed through picture memory 20 and an abstraction of such image takes place in recognition analyzer 25. This process from collection of images at camera 12 through abstractions at data recognition analyzer 25 is continued until four acceptably similar abstractions have been delivered to data storage 30 in which they are permanently stored as heretofore described.

When a previously-recorded user enters his code via keyboard 36, process and control logic 40 searches and obtains from data storage 30 the four recorded abstractions for this user which are supplied to test unit 32 in which the user's image of his palm from camera 12, picture memory 20 and data recogniton analyzer 25 is compared sequentially with the prior recorded abstractions until a sufficiently accurate match is obtained. If a sufficiently-accurate match is obtained with the first abstraction, no further comparison is necessary. If a sufficiently-accurate match is not obtained by the fourth abstraction, the user is required via indicating means 60 to replace his hand in the palm-positioning device to repeat the above process.

On the first sufficiently-accurate match, the user is considered identified. Failing a sufficiently-accurate match, the user is not considered identified.

Due to the use of multiple abstractions of a person's palm in data 30, the probability of matching the user's palm image at camera 12 to one of these abstractions is much greater and exceeds any increase of risk in falsely accepting an imposter's hand.

A further embodiment of the present invention comprises an update process by which the ability of each of the four abstractions to provide accurate recognition data is monitored and periodically the least accurate abstraction is replaced in data storage 30 by a new image at camera 12 processed in the manner described above.

This permits the system to track long-term changes in the person's palm image and provides for up to date recognition data.

It will therefore be appreciated that the aforementioned and other objects have been achieved; however, it should be emphasized that the particular analysis method which is shown and described herein, is intended as merely illustrative and not restrictive of the invention.

The invention is claimed in accordance with the following:

1. A method of recording the characteristics of the palm of a person, comprising the steps of:
    positioning the person's palm in relation to a palm-positioning means;
    scanning the palm by the use of scanning means to produce an image of the person's palm;
    producing abstractions based on calculations and representative of the person's palm;
    temporarily storing said abstractions;
    processing more than one of said abstractions to determine if the abstractions are acceptable in comparison to each other; and
    permanently storing more than one of said acceptable abstractions.

2. A method according to claim 1 wherein at least four of said abstractions are permanently stored.

3. A method of periodically updating permanently-stored abstractions formed from images of a person's palm, comprising the steps of:
    positioning the person's palm in a palm-positioning device;
    scanning the palm by the use of scanning means to produce an image of the person's palm;
    retrieving multiple abstraction files of the person's palm from storage;
    conducting a comparison test of the palm image against said abstraction files until a sufficiently accurate match therebetween is obtained;
    periodically inspecting the historic performance of the stored abstraction files to determine the least accurate thereof;
    producing a new abstraction file from the sufficiently accurate image; and
    replacing the least accurate stored abstraction file with said new abstraction file.

* * * * *